May 13, 1930.  H. G. HANCOCK  1,758,038
SNAP HOOK
Filed July 6, 1929
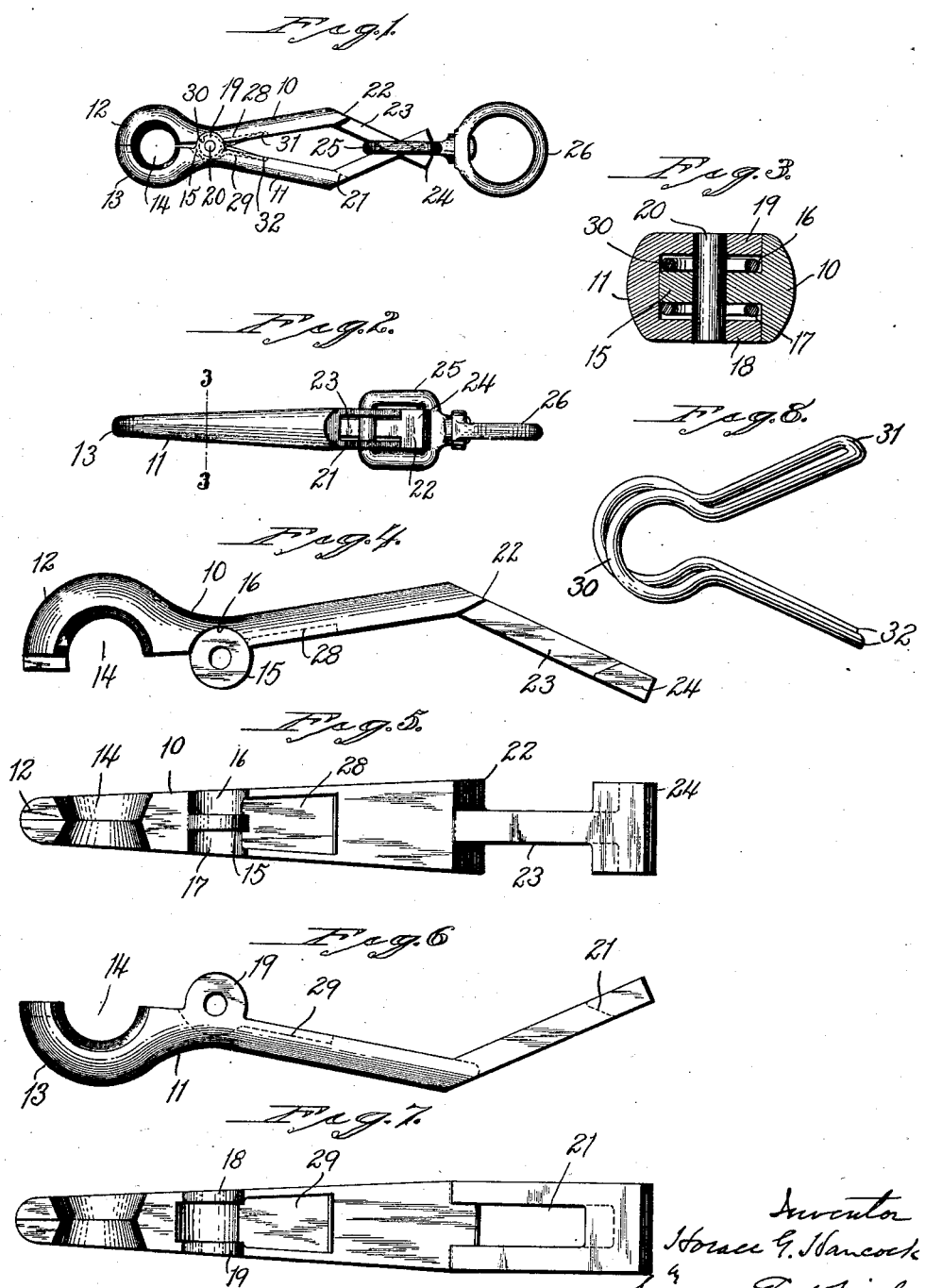
Inventor
Horace G. Hancock Patented May 13, 1930

1,758,038

UNITED STATES PATENT OFFICE

HORACE G. HANCOCK, OF NEW HAVEN, CONNECTICUT, ASSIGNOR TO THE O. B. NORTH & CO., OF NEW HAVEN, CONNECTICUT, A CORPORATION

SNAP HOOK

Application filed July 6, 1929. Serial No. 376,315.

This invention relates to improvement in snap hooks and while especially designed for halter trimmings is equally applicable for various purposes. The invention especially relates to that type of snap hooks which comprise two complementary members pivotally connected together with semi-circular hooks at their outer ends which, when closed, form an eye with inwardly-extending ends, the terminals of which are crossed through a loop to which a swivel is attached with a spring tending to hold the ends of the hooks together. In the more general construction of snap hooks of this type a sheet-metal spring is employed, but sheet-metal springs are liable to break and usually necessitate a riveting operation for securing them in place.

The object of this invention is to employ wire springs and the construction of the device is particularly adapted for such springs, and the invention consists in the construction as hereinafter described and particularly recited in the claims.

In the accompanying drawings:

Fig. 1 is a side view of a snap hook constructed in accordance with my invention;

Fig. 2 is an edge view of the same;

Fig. 3 is a sectional view on the line 3—3 of Fig. 2 enlarged;

Fig. 4 is a side view of one member of the device detached;

Fig. 5 is an inside face view of the same;

Fig. 6 is a side view of the other member detached;

Fig. 7 is a face view of the same; and

Fig. 8 is a perspective view of the spring detached.

In carrying out my invention I employ two complementary members 10 and 11. These members are formed at their respective outer ends with semicircular hooks 12 and 13, which, when brought together, form an eye 14. The member 10 is formed at the rear of its hook with a centrally-arranged inwardly-projecting lug 15 with semicircular clearance-notches 16 and 17 and on opposite sides to receive ears 18 and 19 on the other member 11, the space between the ears being greater than the thickness of the lug 15, and these ears and lugs are perforated for the reception of a rivet 20. The inner end of the member 11 is turned at an angle in the usual direction and is formed with a clearance-slot 21, while the member 10 is provided with a corresponding angular portion 22 which is reduced in width to form a bar 23 and a head 24 which, by turning, may pass through the slot 21. The inner ends of the two members pass through a loop 25 provided with a swivel-eye 26. The member 10 is also formed in rear of its lug 15 with a longitudinal recess 28, and the member 11 with a corresponding recess 29 to receive the ends of a spring 30. This spring is formed from a single piece of wire doubled at the center to form one end 31 of the spring, while the two ends of the wires form the other end 32. The two reaches of the spring thus doubled are curved at the center so that it may set over the lug 15 so that the reaches stand on opposite sides thereof and in the spaces provided between the lug 15 and the ears 18 and 19, while the ends of the springs extend into the recesses 28 and 29.

In assembly, the bowed portions of the springs are set over the lug 15 and grasp the opposite sides thereof, so that the spring is held in position when the other member is set in place, so that by pressing the two members together the rivet is readily inserted in position.

A doubled wire spring provides the necessary tension for holding the hooks together and cannot be displaced and is less liable to break than a sheet-metal spring and simplifies the construction and assembly of the device.

I claim:

1. A snap hook comprising two complementary members having hooks at their outer ends, one provided with a centrally-arranged inwardly-extending lug and the other with two corresponding ears, the space between the ears being greater than the width of the lug, and a wire spring formed from a single piece of wire doubled upon itself and bowed at its center, the bows standing on opposite sides of the lug between said ears.

2. A snap hook comprising two complementary members having hooks at their outer ends and interlocked at their inner ends, one of said members being formed with a centrally-arranged inwardly-projecting lug and the other provided at its sides with complementary ears, the inner faces of said members in rear of said ears and lugs formed with recesses, and a spring formed from a single piece of wire doubled to form one end seated in one recess, the two ends forming the other end of the spring seated in the other recess, the central portion of the spring bowed and arranged on opposite sides of the lugs and between said ears.

In testimony whereof, I have signed this specification.

HORACE G. HANCOCK.